United States Patent
Buhr et al.

(10) Patent No.: US 8,172,150 B2
(45) Date of Patent: May 8, 2012

(54) INTEGRATED CIRCUIT CARD

(75) Inventors: Wolfgang Buhr, Hamburg (DE); Birger Rosenberg, Buxtehude (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 12/921,600

(22) PCT Filed: Feb. 26, 2009

(86) PCT No.: PCT/IB2009/050774
§ 371 (c)(1),
(2), (4) Date: Sep. 9, 2010

(87) PCT Pub. No.: WO2009/112963
PCT Pub. Date: Sep. 17, 2009

(65) Prior Publication Data
US 2011/0006121 A1    Jan. 13, 2011

(30) Foreign Application Priority Data

Mar. 11, 2008   (EP) .................................. 08102496
Feb. 26, 2009   (WO) .................. PCT/IB2009/050774

(51) Int. Cl.
*G06K 19/06*   (2006.01)
(52) U.S. Cl. ....................................................... 235/492
(58) Field of Classification Search .................. 235/492; 709/229
See application file for complete search history.

(56) References Cited

U.S. PATENT DOCUMENTS

2004/0015594 A1   1/2004   Guterman et al.
2005/0077363 A1   4/2005   Seo

FOREIGN PATENT DOCUMENTS

EP   1 564 630 A   8/2005

OTHER PUBLICATIONS

International Search Report for Application PCT/IB2009/050774 (Feb. 26, 2009).

*Primary Examiner* — Kristy A Haupt

(57) ABSTRACT

The invention relates to an integrated circuit card (1) comprising: an input/output block (4) for receiving external command data from an interface device (2); a central processing unit (CPU) (3) in signal communication with the input/output block (4) for performing a task corresponding to the received command data; a judgement block (5) in signal communication with the central processing unit (3) for judging whether a working time of the central processing unit (3) reaches a reference time, after an input of the external command data is completed; and a control block (6) in signal communication with the judgement block (5) for operating responsive to an output of the judgement block, wherein the control block controls such that a S(WTX request) is output via the input/output block (4) without intervention by the central processing unit whenever the interface device (2) connected to the integrated circuit card (1) transmits a command to the integrated circuit card and the integrated circuit card is not able to respond to this command within the defined maximum waiting time.

13 Claims, 1 Drawing Sheet

INTEGRATED CIRCUIT CARD

FIELD OF THE INVENTION

The invention relates to an integrated circuit card according to the features of claim 1.

BACKGROUND OF THE INVENTION

Integrated circuit (IC) cards are well known and they are very often used for identification e.g. to allow an otherwise restricted access to a facility or for allowance of certain financial transactions by the user of such an integrated circuit card.

An integrated circuit card is a card which contains an integrated circuit and which receives and transmits data according to an interface defined e.g. by ISO Standard 7816. Therefore electronic signals, data structure and transmission protocols of the integrated circuit are e.g. defined in ISO 7816-3. ISO 7816 is an international standard which defines characteristic features of such integrated circuit cards. For example ISO 7816-1 defines the physical characteristics of such integrated circuit cards and ISO 7816-3 defines the electronic signals and transmission protocols.

With asynchronous half-duplex character transmission protocol as defined by ISO 7816-3, hereinafter referred to as "T=1 transmission protocol", if an interface device transmits a command to an integrated circuit card and the integrated circuit card is not able to respond to this command within the defined maximum waiting time, the integrated circuit card has to transmit a WTX-request, hereinafter referred to as waiting time extension request, i.e. a S-block requesting a waiting time extension to the interface device.

Usually block frames transmitted by the card may comprise I-blocks as so called information blocks, R-blocks as so called receive ready blocks and S-blocks as so called supervisory blocks. According to the value of certain bit fields within these blocks, they can be coded as different commands or messages.

In particular, the S-block command S(WTX request) is transmitted from the integrated circuit card to the interface device in order to gain an additional working time when a time needed to process the received command exceeds the maximum Character-/Block-Waiting-Time.

The interface device resets a timer for measuring a Character-Waiting-Time or Block-Waiting-Time when the S(WTX request) block is transmitted from the integrated circuit card, so that the waiting time is reset.

In the case of the aforementioned T=1 transmission protocol, the integrated circuit card has to transmit the S(WTX request) block to the interface device before the time taken to process the input command exceeds the maximum waiting time. This means that a central processing unit of a conventional integrated circuit card must stop executing the command being currently executed in order to process a procedure for transmitting the S(WTX request) block. As is well known, the integrated circuit card processes a command according to an application program. For this reason, the procedure for transmitting the S(WTX request) block causes program overhead. In addition, in cases where it is impossible to stop execution of a current input command, the interface card does not receive a response from the integrated circuit card within the work waiting time and treats a current communication state as a communication error. Accordingly, normal communication between the interface device and the integrated circuit card is not completed. This leads to disadvantages and errors in communication of a integrated circuit card and an interface device.

SUMMARY OF THE INVENTION

Therefore it is an object of the invention to create an integrated circuit card which mitigates the above mentioned problems.

The above mentioned problems will be solved by using an integrated circuit card comprising: an input/output block for receiving external command data from an interface device; a central processing unit (CPU) in signal communication with the input/output block for performing a task corresponding to the received command data; a judgement block in signal communication with the central processing unit for judging whether a working time of the central processing unit reaches a reference time, after an input of the external command data is completed; and a control block in signal communication with the judgement block for operating responsive to an output of the judgement block, wherein the control block controls such that a S(WTX request) is output via the input/output block without intervention by the central processing unit whenever the interface device connected to the integrated circuit card transmits a command to the integrated circuit card and the integrated circuit card is not able to respond to this command within the defined maximum waiting time.

Furthermore it is of advantage that the integrated circuit card is working in the T=1 transmission protocol.

According to the invention the S(WTX request) is a supervisory block waiting time request.

Additionally it is of advantage that the code of the S(WTX request) in a 6-bit pattern is "000011".

Furthermore it is more advantageous that the judgement block sets the input/output block to a reception mode when transmission of the procedure data has been ended.

Additionally it is of advantage that the judgement block sets the control block to an acknowledge-reception mode when transmission of the procedure data has been ended.

According to another embodiment of the invention the integrated circuit card checks the S(WTX response) block sent by the interface device in return to the S(WTX request) block previously sent by the integrated circuit card. Further advantages of the invention are described with reference to the dependent claims.

BRIEF DESCRIPTION OF THE DRAWINGS

The above and other features and advantages of the invention will be apparent from the following description of an exemplary embodiment of the invention with reference to the accompanying drawings, in which.

DETAILED DESCRIPTION OF THE DRAWINGS

Figure 1:
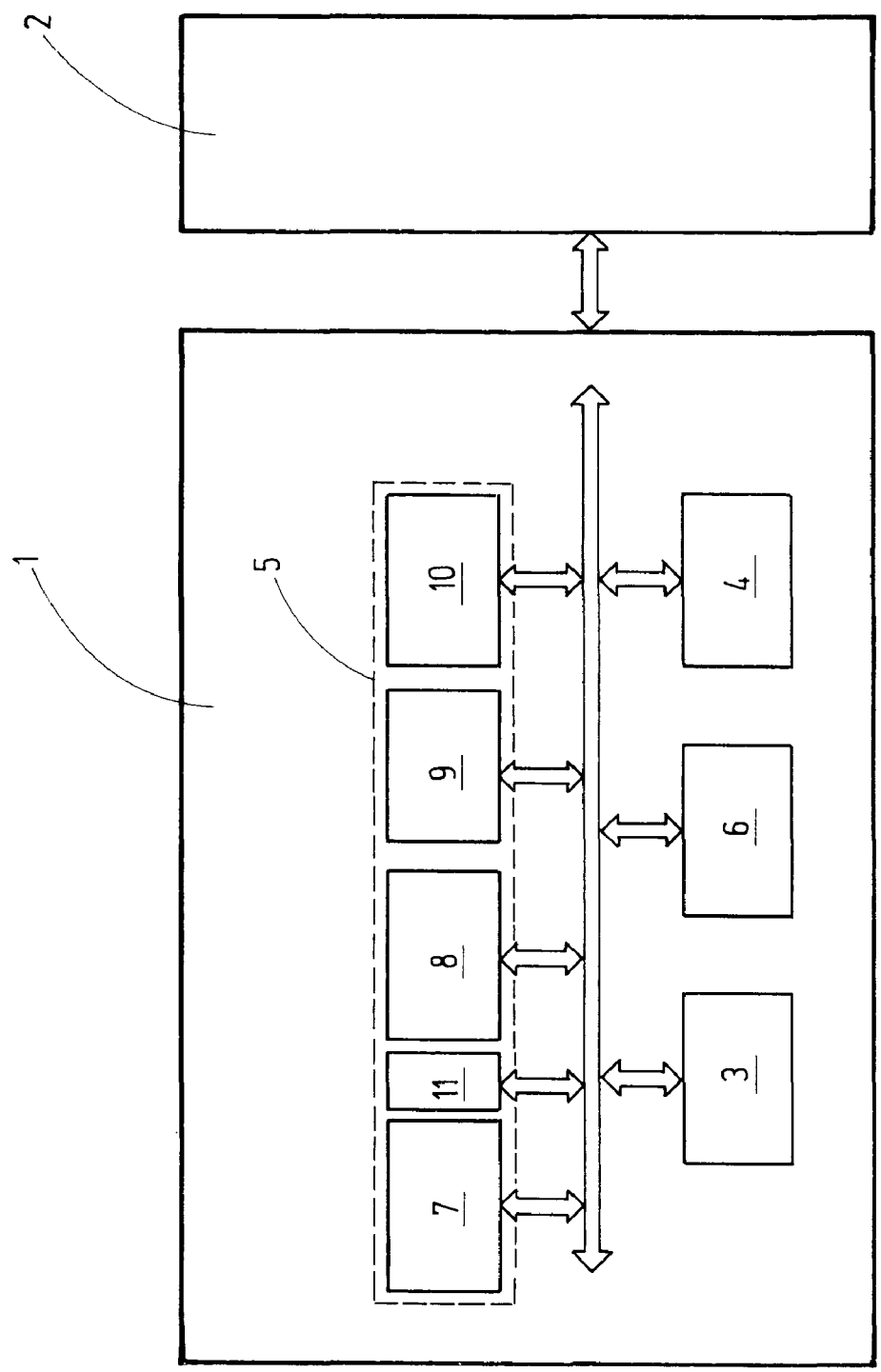
FIG. 1 shows a schematic view of an integrated circuit card.

FIG. 1 shows a schematic view of an integrated circuit card 1 which is in communication with an interface device 2. The circuit card contains a central processing unit 3 or handling input data from the interface, outputting data to the interface or treating data according to the internal processes and methods to calculate or compare data to achieve a desired result. An embodiment of an inventive circuit card 1 is capable of automatically transmitting a waiting time extension request WTX without intervention by the central processing unit (CPU). Such waiting time extension requests are e.g. S(WTX) blocks as defined in the T=1 Protocol.

According to one aspect of the present invention, an integrated circuit card 1 includes an input/output block 4 for receiving external command data; a central processing unit 3 for processing the received command data; a judgement block 5 for judging whether the processing runtime of the central processing unit 3 reaches a reference time, after an input of the external command data is completed; and a control block 6 for operating responsive to an output of the judgement block 5, wherein the control block 6 controls such that procedure data (e.g., an S(WTX) block) is output via the input/output block 4 without intervention by the central processing unit 3 whenever the processing runtime of the central processing unit 3 reaches the reference time.

In an advantageous embodiment of the invention, the judgement block 5 sets the input/output block 4 to a reception mode when transmission of the procedure data has been ended.

In a further advantageous embodiment of the invention, the judgement block 5 sets the control block 6 to an acknowledge-reception mode when transmission of the procedure data has been ended. This allows to check the S(WTX response) block sent by the interface device 2 in return to the S(WTX request) block previously sent by the integrated circuit card 1. The control block 6 signals the result of the S(WTX response) block evaluation to the central processing unit 1, if the waiting time request is not acknowledged by the interface device 2.

According to an other advantageous embodiment, the judgement block 5 comprises: an oscillator 7 circuit configured to generate a clock signal; a register 8 configured to store the reference time; a counter 9 configured to count in synchronization with the clock signal when an input of the command data is completed; and a comparator 10 for judging whether a count time of the counter reaches the reference time. The counter 9 is reset by an output of the comparator 10 when the input of the command data is completed or when the count time of the counter reaches the reference time. The judgement block further comprises a switch circuit 11 that transfers the clock signal to the counter 9 when the input of the command data is completed.

REFERENCES 1 integrated circuit card
2 interface device
3 central processing unit
4 input/output block
5 judgement block
6 control block
7 oscillator
8 register
9 counter
10 comparator
11 switch circuit

The invention claimed is:

1. An Integrated Circuit (IC) card comprising:
    an input/output block that receives command data from an interface device;
    a central processing unit (CPU) in signal communication with the input/output block that performs a task corresponding to the received command data;
    a judgment block in signal communication with the CPU that judges whether a working time of the CPU reaches a reference time, after an input of the command data is completed; and
    a control block in signal communication with the judgment block that operates, responsive to an output of the judgment block, wherein the control block controls output of a S-block Waiting Time eXtension S(WTX) request via the input/output block without intervention by the CPU whenever the interface device connected to the IC card transmits a command to the IC card and the IC card is not able to respond to the transmitted command within a defined maximum waiting time.

2. The IC card of claim 1, wherein the IC card uses a T=1 transmission protocol.

3. The IC card of claim 1, wherein the S(WTX) request is a supervisory block waiting time request.

4. The IC card of claim 1, wherein the code of the S(WTX) request in a 6-bit pattern is "000011".

5. The IC card of claim 1, wherein the judgment block sets the input/output block to a reception mode when transmission of procedure data has been ended.

6. The IC card of claim 1, wherein the judgment block sets the control block to an acknowledge-reception mode when transmission of procedure data has been ended.

7. The IC card of claim 1, wherein the IC card checks the S(WTX) request sent by the interface device in return to the S(WTX) request previously sent by the IC card.

8. The IC card of claim 1, wherein the judgment block further comprises:
    an oscillator that generates a clock signal; and
    a counter that counts in synchronization with the clock signal.

9. The IC card of claim 8, wherein the counter initiates counting after the input of the command data is completed.

10. The IC card of claim 8, wherein completion of the input of the command data resets the counter.

11. The IC card of claim 8, wherein the judgment block further comprises:
    a switch circuit that transfers the clock signal from the oscillator to the counter after the input of the command data is completed.

12. The IC card of claim 8, wherein the judgment block further comprises:
    a register that stores a reference time; and
    a comparator that judges whether a count time of the counter has reached the reference time.

13. The IC card of claim 12, wherein the comparator resets the counter after the count time of the counter has reached the reference time.

* * * * *